UNITED STATES PATENT OFFICE.

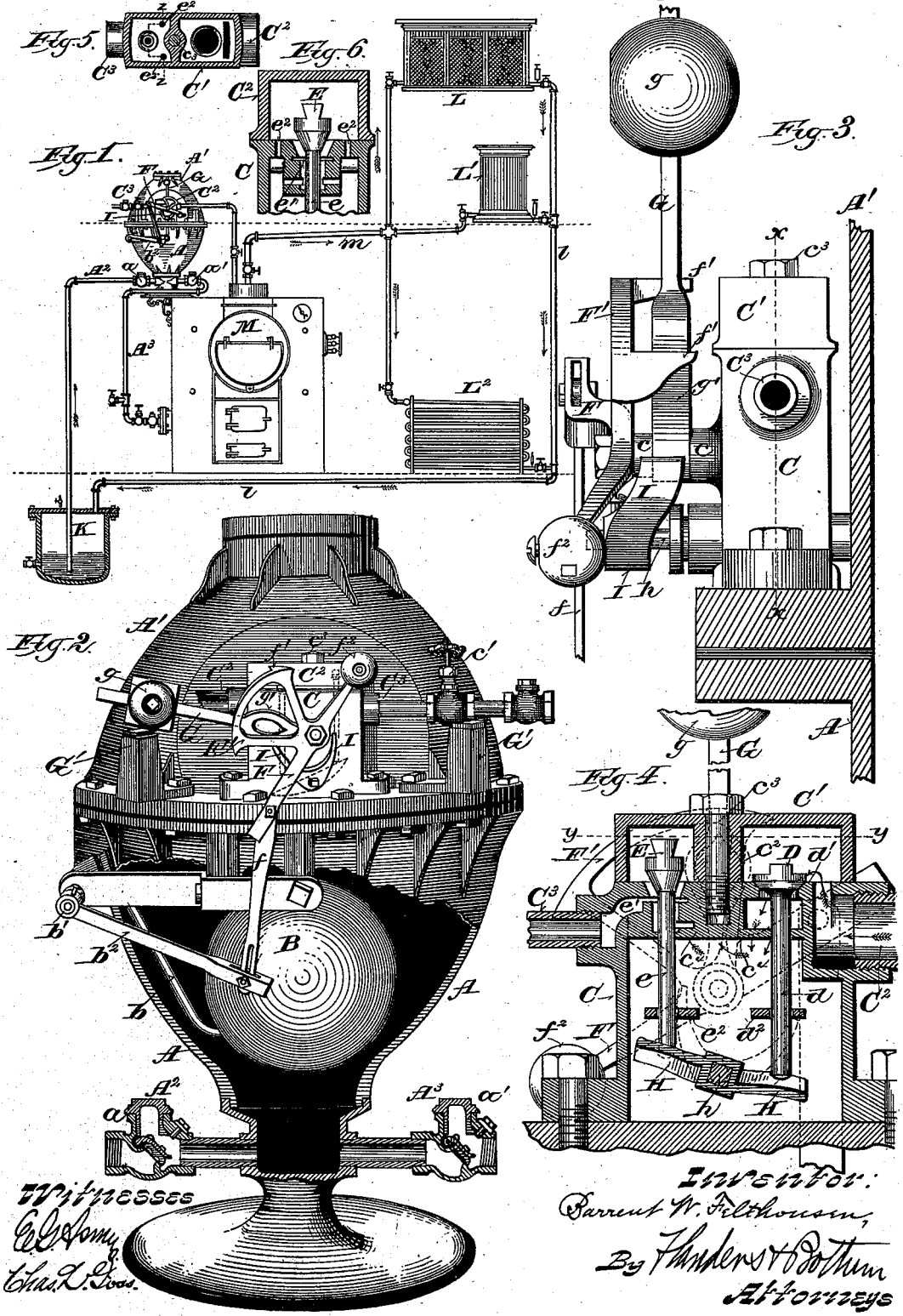

BARRENT W. FELTHOUSEN, OF MILWAUKEE, WISCONSIN, ASSIGNOR TO THE ALBANY STEAM TRAP COMPANY, OF NEW YORK.

STEAM-TRAP.

SPECIFICATION forming part of Letters Patent No. 402,516, dated April 30, 1889.

Application filed July 30, 1888. Serial No. 281,470. (No model.)

*To all whom it may concern:*

Be it known that I, BARRENT W. FELTHOUSEN, of the city and county of Milwaukee, and State of Wisconsin, have invented certain new and useful Improvements in Steam-Traps; and I do hereby declare that the following is a full, clear, and exact description of the invention, which will enable others skilled in the art to which it pertains to make and use the same, reference being had to the accompanying drawings, and to the letters of reference marked thereon, which form a part of this specification.

The object of my invention is to automatically return the water of condensation from steam-coils, &c., to the boiler under pressure and to automatically supply the boiler with water under pressure.

It consists, essentially, of certain peculiarities of construction and arrangement, hereinafter specifically set forth, and pointed out in the claims.

In the accompanying drawings like letters designate the same parts in the several figures.

Figure 1 is a diagram showing the relative arrangement of the trap to the boiler-coils, &c. Fig. 2 is a perspective view, on an enlarged scale, of the trap, a portion of which is broken away to disclose the float and its connections. Fig. 3 is a side elevation of the valve-operating gear. Fig. 4 is a vertical section of the valve-case on the line $x\,x$, Fig. 3. Fig. 5 is a reduced horizontal section of the valve-case on the line $y\,y$, Fig. 4; and Fig. 6 is a vertical cross-section on the line $z\,z$, Fig. 5, of a portion of the valve-case.

Referring to Fig. 2, A A' represent the trap-case, preferably of spheroidal form and made in two sections, which are united horizontally at or near the center by flanges and bolts. $A^2$ and $A^3$ are the receiving and discharging pipes, both communicating with the bottom or lower part of the trap, and provided, respectively, with an inwardly-opening check-valve, $a$, and an outwardly-opening check-valve, $a'$.

B is a hollow spherical float attached to a vibrating arm, $b$, which is secured to a shaft, $b'$, passing through a stuffing-box (not shown) in the side of the trap A. To the outer end of the shaft $b'$ is attached an arm, $b^2$. The arm $b$ and shaft $b'$ are made tubular, and together afford a continuous passage, communicating with the interior of float B and terminating outside of the trap in an opening, through which any water leaking into said float is discharged whenever said float is raised above said shaft.

In a recess formed for the purpose in the upper section, A', of the trap is secured the valve-case C, which opens at the bottom through the flange, to which it is attached, into the trap.

Referring to Fig. 4, $c^4$ is a horizontal partition, in which are formed seats for the steam-valve D and the relief-valve E. The stems $d$ and $e$ of said valves extend downwardly, and are held in place by guides $d^2$ and $e^2$, provided therefor inside the valve-case.

C' is the cover of the valve-case, divided transversely by the partition $c^2$ and secured thereto by a bolt, $c^3$.

$C^2$ is a pipe connecting the dome or steam-space of the boiler with the chamber above the steam-valve D.

The relief-valve E has a double seat divided horizontally by an opening, $e'$, as seen in Figs. 4 and 6, which communicates with the exhaust-pipe $C^3$. The chamber above the valve E communicates through openings $e^2\,e^2$ (shown in Figs. 5 and 6) with the interior of valve-case C, so as to permit steam to pass freely from the latter into the former, and thus nearly balance said valve. The exhaust-pipe $C^3$ is provided with a globe-valve, $c'$, which is made to leak slightly, and thus afford a constant escape-opening for air and steam when the relief-valve E is open.

F is a lever fulcrumed upon a spindle, $c$, projecting from the front of the valve-case C. It is formed on one side with a sector-shaped projection, which has at the ends of its arc two lateral projections, $f'\,f'$, as shown in Fig. 3. This lever F is connected at one end by a rod, $f$, with the arm $b^2$, and is provided at the other end with a counter-weight, as shown in Fig. 2. Upon the same spindle, $c$, is fulcrumed inside of the lever F a lever, G, which is formed with inclined faces $g'$, and is provided with a weight, $g$, adjustably secured thereto.

G' G' are cushioned blocks attached to the trap on each side of the valve-case C in position to arrest the movement of the weighted lever G at the proper point in either direction.

I is a V-shaped lever attached at its apex to a shaft, $h$, which passes through a stuffing-box just below the spindle $c$ into the valve-case C, and is provided inside of said valve-case with a cross-head, H, having laterally-inclined wings H H. (See Figs. 2, 3, and 4.)

Referring to Fig. 1, M represents the boiler, above which the trap A A' is located, and with which it is connected by the steam-pipe $C^2$ and the water-pipe $A^3$, the former being connected with the steam-dome or upper part of the boiler and the latter with the mud-drum or lower part of the boiler.

L L' $L^2$ represent steam radiators and coils, which are supplied with steam from the boiler through pipe $m$ and its branches, and which are all connected by an exhaust or waste pipe, $l$, with a steam-tight receiving-chamber, K, located below the lowest radiator or coil, so as to receive the condensed steam therefrom.

The induction-pipe $A^2$ of the trap is connected with and extends into the lower part of said receiving-chamber K.

My improved trap operates as follows: The steam-valve D being closed and the relief-valve E being open, the condensed steam from the coils, &c., drains through the waste pipe or pipes into chamber K, and is forced therefrom by the steam-pressure in the coils, which must be sufficient to raise the water to that height into the trap from which the air is expelled through the valve-case C and relief-pipe $C^3$. The water, rising inside the trap, lifts the float B, which raises the arm $b^2$, and, acting through the connecting-rod $f$, raises the lever F until one of the projections $f'$ on its sector-shaped extension engages the lever G and carries the same up past its central or vertical position. The weight $g$ then carries said lever G to the right until its movement in that direction is arrested by the stop-block G' on that side of the valve-case. As the lever G falls to the right one of its inclined faces engages the right-hand arm of the V-lever I and moves it to the right, at the same time turning the cross-head H so as to raise and open the steam-valve D and permit the relief-valve E to be seated and closed. The steam-valve D being thus opened, steam rushes from the boiler through pipe $C^2$ and the valve-case C into the trap, and, the pressure in the trap and boiler being equalized, the water is carried by its own gravity through the eduction-pipe $A^3$ into the boiler, the check-valve $a$ preventing its flowing back through pipe $A^2$ into the receiving-chamber K. The float, descending with the water in the trap, operates the valve-actuating mechanism in the opposite direction, in the manner just described, and when the trap is nearly emptied opens the relief-valve E and allows the steam-valve D to close. The steam when admitted to the trap, acting upon the top as well as upon the smaller area of the under side of the valve E, cannot lift the same from its seat, and thus escape through the relief-pipe $C^3$. The valve-case, being distinct and detachable from the trap, affords easy access to the valves; or they can be readily reached by removing the cover C' of the valve-case. The valve-actuating mechanism being outside of the trap, exposed to view, its operation may be observed and any irregularities or defects therein readily detected and remedied without taking the trap apart. When employed to supply the boiler with water, the action of the trap is the same as hereinbefore described.

I claim—

1. The combination, in a steam-trap, of a valve-case having a steam-connection and relief-opening, steam and relief valves seated in said case and having depending stems, a rock-shaft extending through said valve-case and provided on the outside with a V-lever and on the inside with a cross-head, which is arranged to engage said valve-stems, a weighted lever fulcrumed to said valve-case and working with said V-lever, a lever fulcrumed concentrically with said weighted lever and having projections working therewith, and a float having an external connection with said last-named lever, substantially as and for the purposes set forth.

2. The combination, in a steam-trap with steam and relief valves having depending stems, of a rock-shaft provided with inclined wings working with said valve-stems, whereby the valves are slightly turned each time they are opened and closed, and thus caused to wear evenly on their seats, substantially as and for the purposes set forth.

3. The combination, in a steam-trap with the steam and relief valves having downwardly-projecting stems, of a rock-shaft provided with a cross-head working with said valve-stems, and a V-lever, a weighted lever fulcrumed between the limbs of said V-lever and arranged to operate the same, and a lever connected with a float which operates to carry said weighted lever in opposite directions past its center of gravity, substantially as and for the purposes set forth.

4. The combination, in a steam-trap with steam and relief valves, of a rock-shaft provided with a cross-head arranged to open said valves alternately, and with a V-lever and a weighted lever fulcrumed between the limbs of said V-lever and provided with inclined sides working therewith, and a float connected with a lever which is arranged to move said weighted lever past its center of gravity, substantially as and for the purposes set forth.

In testimony that I claim the foregoing as my own I affix my signature in presence of two witnesses.

BARRENT W. FELTHOUSEN.

Witnesses:
CHAS. L. GOSS,
E. H. BOTTUM.